US008267624B2

(12) United States Patent
Ritter et al.

(10) Patent No.: US 8,267,624 B2
(45) Date of Patent: Sep. 18, 2012

(54) FULL POINT WIDTH CUTTING BLADES

(75) Inventors: Reinhardt Ritter, Kirchheim-Jesingen (DE); Uwe Gaiser, Ostfildem (DE); Earl D. Ervay, Fairport, NY (US)

(73) Assignee: The Gleason Works, Rochester, NY (US)

( * ) Notice: Subject to any disclaimer, the term of this patent is extended or adjusted under 35 U.S.C. 154(b) by 1143 days.

(21) Appl. No.: 11/167,502

(22) Filed: Jun. 27, 2005

(65) Prior Publication Data

US 2006/0291972 A1     Dec. 28, 2006

(51) Int. Cl.
B23F 21/22     (2006.01)

(52) U.S. Cl. ............... 409/25; 409/27; 409/53; 407/21

(58) Field of Classification Search ............. 409/25–27, 409/29, 50–54; 407/21–22
See application file for complete search history.

(56) References Cited

U.S. PATENT DOCUMENTS

| 1,236,834 A | 8/1917 | Gleason |
| 1,667,299 A | 4/1928 | Wildhaber |
| 2,024,494 A | 12/1935 | Wildhaber |
| 2,913,962 A * | 11/1959 | Carlsen et al. ............ 409/51 |
| 2,974,399 A * | 3/1961 | King et al. ............ 407/21 |
| 3,138,996 A * | 6/1964 | Fidd et al. ............ 409/54 |
| 3,192,604 A | 7/1965 | Whitmore |
| 3,268,980 A | 8/1966 | Blakesley et al. |
| 3,760,476 A | 9/1973 | Kotthaus |
| 4,137,001 A | 1/1979 | Fountain |
| 4,260,299 A * | 4/1981 | Ryan et al. ............ 407/115 |
| 4,278,370 A | 7/1981 | Spear |
| 4,575,285 A | 3/1986 | Blakesley |
| 5,890,846 A * | 4/1999 | Clark et al. ............ 407/21 |
| 6,120,217 A | 9/2000 | Stadtfeld et al. |

FOREIGN PATENT DOCUMENTS

WO   WO 2004/103624   12/2004

OTHER PUBLICATIONS

Durante, Piovano et al., "Manuale degli Utensili", Dec. 2001, Tecniche Nuove, (via Eritrea 21, 20157 Milano, Italy), Settimo Milanese, Milano, Italy, XP002406908, ISBN 88 481 1217 X, pp. 878-880.*

* cited by examiner

Primary Examiner — Erica E Cadugan
(74) Attorney, Agent, or Firm — Robert L. McDowell

(57) ABSTRACT

A cutting blade for face milling wherein the cutting blade is constructed to cut a predetermined final dimension of a tooth slot along a portion of the cutting end (i.e. the primary cutting edge portion) of the blade and to cut the remainder of the tooth slot at an amount less that the predetermined final dimension of the tooth slot along the remaining portion (i.e. the secondary cutting edge portion) of the cutting end. The construction of the inventive cutting blade provides sharing of the cutting load amongst the blade cutting edges and also provides sufficient clearance in the tooth slot whereby the cutting blade can be repositioned to allow truing of the cutter, particularly with respect to the primary portion.

4 Claims, 3 Drawing Sheets

FULL POINT WIDTH CUTTING BLADES

FIELD OF THE INVENTION

The present invention is directed to cutting blades for cutting gears and related toothed articles.

BACKGROUND OF THE INVENTION

In the manufacture of bevel and hypoid gears it is well known to utilize face mill type cutters in both generating and non-generating gear cutting processes. In face mill cutters, cutting blades are arranged in the cutter head such that one tooth slot is formed with each cutting cycle (e.g. plunge, or feed-in and roll) of the cutter. The cutter must be withdrawn and the workpiece indexed to the next tooth slot position in order to form the next tooth slot. With face milling, all cutting blades of the face mill cutter pass through the tooth slot during the cycle until the desired slot geometry (and hence, tooth flank geometry) is formed.

Face milling tools include a plurality of blades projecting from a front face or periphery of a cutter head wherein the cutting blades are arranged in one or more concentric circles about an axis of rotation of the cutter head. Cutting blades may be of the type commonly referred to as stick-type or bar blades made of a length of bar stock (for example, U.S. Pat. No. 4,137,001 to Fountain; U.S. Pat. No. 4,575,285 to Blakesley; U.S. Pat. No. 6,120,217 to Stadtfeld et al.; or U.S. Pat. No. 3,760,476 to Kotthaus). Cutting blades may also be of the form-relieved type (for example, U.S. Pat. No. 3,192,604 to Whitmore or U.S. Pat. No. 3,268,980 to Blakesley et al.). Either type may be made of suitable material such as high speed steel (HSS) or carbide and the blades may have one or more surfaces coated with wear enhancing coatings such as TiN, TIAlN, AlTiN, etc. as is known by the artisan.

Typically in face mill cutters, a set of "inside" blades for cutting convex flanks of work gear teeth are arranged at a first radius from the cutter head axis, and a set of "outside" blades for cutting concave flanks within the same tooth space are arranged at a second larger radius. Examples of this type of cutter can be seen in U.S. Pat. No. 2,024,494 to Wildhaber or U.S. Pat. No. 4,137,001 to Fountain. In some cutters, separate bottom blades are included to cut the bottom of a tooth slot (e.g. U.S. Pat. No. 3,760,476 to Kotthaus) while in other cutters, the inside and outside cutting blades include cutting portions which also cut at the bottom of the tooth slot (for example, U.S. Pat. No. 4,278,370 to Spear). Alternatively, cutting blades that cut the convex side, concave side and the bottom of a tooth slot (i.e. the entire tooth slot) may also be utilized. Examples of this type of cutter are shown in U.S. Pat. No. 1,236,834 to Gleason; U.S. Pat. No. 1,667,299 to Wildhaber; or WO 2004/103624 to Ribbeck.

In producing gears with cutters having inside and outside cutting blades, uneven wear of the cutting blades is of significant concern as certain areas of the blades experience wear and break down earlier than other areas. With cutters having blades that cut the entire tooth slot, large chips tend to form which can result in chip flow problems and truing of such cutters cannot be accomplished since repositioning a cutting blade to true one cutting side of the cutting blade will also affect the position of other cutting side likely causing the other side to shift out of an optimal cutting position.

SUMMARY OF THE INVENTION

The present invention is directed to a cutting blade for face milling wherein the cutting blade is constructed to cut a predetermined final dimension of a tooth slot along a portion of the cutting end (i.e. the primary portion) of the blade and to cut the remainder of the tooth slot at an amount less that the predetermined final dimension of the tooth slot along the remaining portion of the cutting end (i.e. the secondary portion). The construction of the inventive cutting blade provides sharing of the cutting load amongst the blade cutting edges and also provides sufficient clearance in the tooth slot whereby the cutting blade can be repositioned to allow truing of the cutter, particularly with respect to the primary portion.

DETAILED DESCRIPTION OF THE PREFERRED EMBODIMENT

Figure 1:
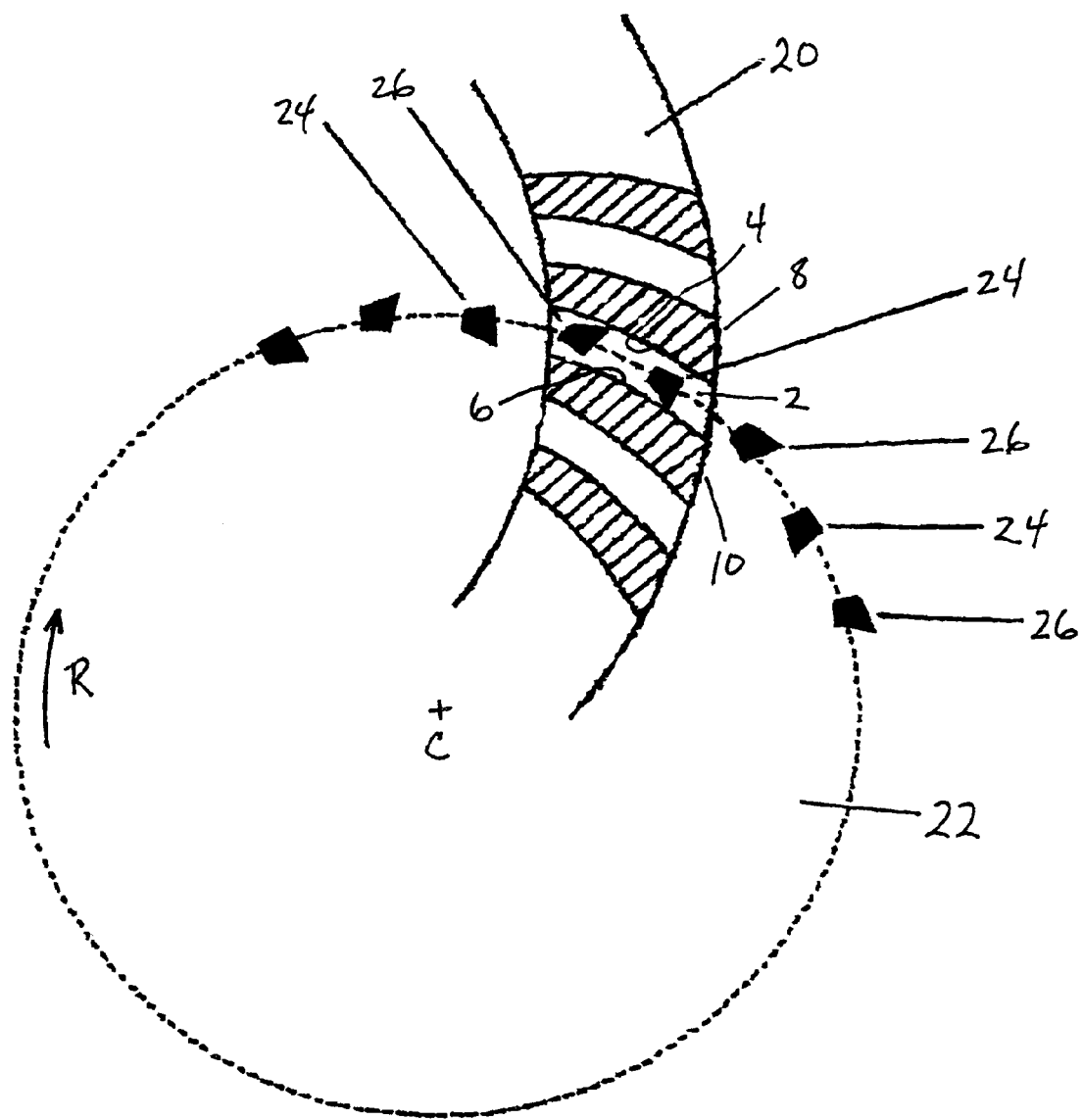
FIG. 1 is an illustration of a face milling process to produce a gear.

The details of the present invention will now be discussed with reference to preferred embodiments which represent the invention by way of example only. In the drawings, the same reference numbers will be utilized to refer to like elements.

FIG. 1 depicts a face milling process utilizing inside and outside cutting blades. A tooth slot 2 is being formed between opposing tooth surfaces 4, 6 of adjacent teeth 8, 10 of a workpiece 20 such as, for example, a spiral bevel gear. A face mill cutter 22, having alternating inside cutting blades 24 and outside cutting blades 26 (only a portion shown) arranged about a circle with a center C, rotates in direction R such that all cutting blades on the cutter pass through slot 2 as the cutter is fed relative to the workpiece to a predetermined full depth position. Inside cutting blades 24 cut the lengthwise convex shaped tooth surface 6 of tooth 10 while outside cutting blades 26 cut the lengthwise concave shaped tooth surface 4 of tooth 8.

Figure 2:
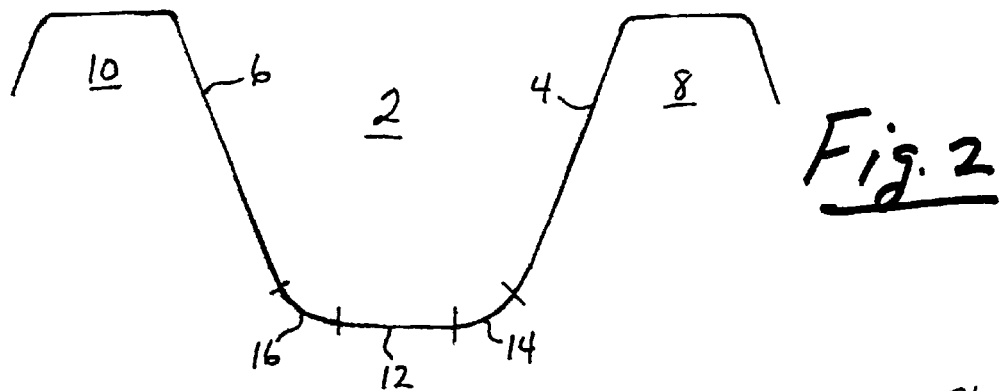
FIG. 2 is a representative diagram of a gear tooth slot.

FIG. 2 illustrates the general cross sectional form of tooth slot 2 in a gear, such as the gear 20 of FIG. 1. The tooth slot 2 comprises opposite sides 4, 6 of adjacent teeth 8, 10 and further includes a bottom portion 12 and radius portions 14 and 16.

Figure 3:
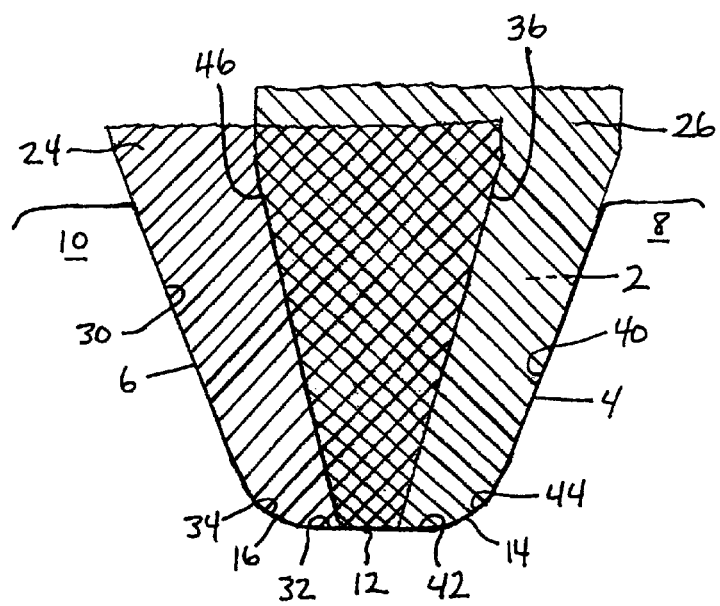
FIG. 3 illustrates the cutting positions of one type of prior art cutting blades for cutting a gear during face milling.

FIG. 3 shows, in an overlapping view, the respective positions of inside cutting blades 24 and outside cutting blades 26 of the prior art as they pass sequentially through the slot 2. It can be seen that inside cutting blade 24 includes a pressure angle cutting edge 30, for cutting the convex surface 6 of tooth 10, and further includes a tip edge 32 for cutting a portion of the bottom 12 of the slot 2 as well as a pressure radius edge portion 34 for cutting corresponding tooth slot radius 16. Inside cutting blade 24 also includes clearance side 36 which does not cut a tooth surface. It can also be seen that outside cutting blade 26 includes a pressure angle cutting edge 40, for cutting the concave surface 4 of tooth 8, and further includes a tip edge 42 for cutting a portion of the bottom 12 of the slot 2 as well as a pressure radius edge portion 44 for cutting corresponding tooth slot radius 14. Outside cutting blade 26 also includes a clearance side 46.

Figure 4:
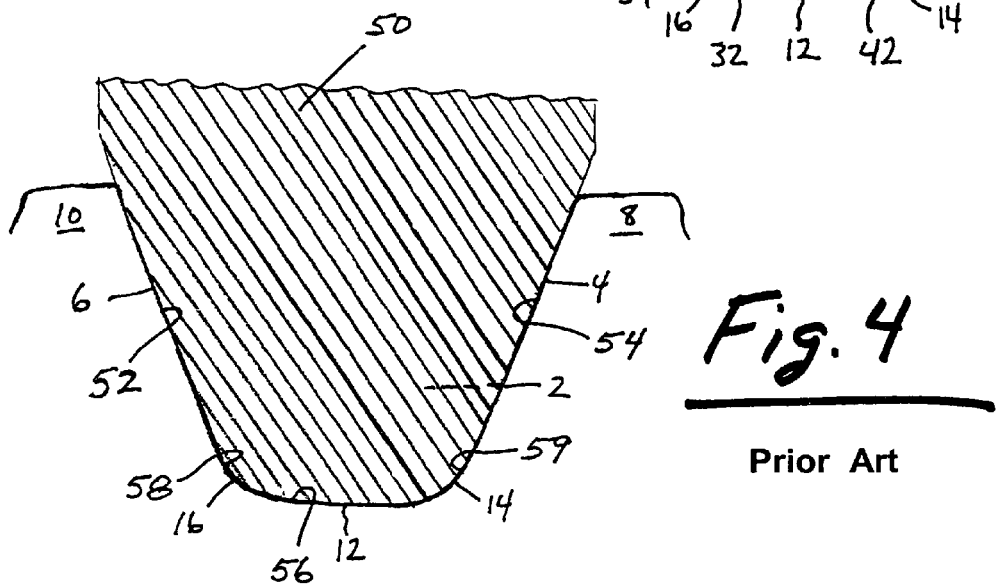
FIG. 4 illustrates a prior art cutting blade for cutting the entire tooth slot of a gear during face milling.

FIG. 4 shows another prior art arrangement for face milling wherein each cutting blade 50 passing through a tooth slot 2 cuts both sides 4, 6 of the tooth slot as well as the bottom 12 and radius portions 14, 16 of the tooth slot 2. In other words, the cutting blade of FIG. 4 is a full-slot blade in that each cutting blade 50 cuts with both side cutting edges 52, 54 as well as with a tip cutting edge 56 and radius cutting edge portions 58, 59.

As previously mentioned, with cutters having inside and outside cutting blades as shown in FIG. 3, uneven wear of the cutting blades is of significant concern as areas of the blades, such as the pressure radius cutting edge portions 34, 44 in particular, experience wear and break down earlier than other areas due to high cutting loads. With cutters having blades that cut the entire tooth slot, as in FIG. 4 for example, large chips tend to form which can result in chip flow problems. Also, truing of such cutters cannot be accomplished since repositioning a cutting blade to true one cutting side edge of the cutting blade will also affect the other cutting side edge likely causing the other side to shift out of an optimal cutting position. Furthermore, cutting blades having cutting edges on both sides usually include a zero front rake angle which is not optimal for cutting.

The inventors have discovered that by including a more encompassing cutting region on a cutting blade, one that dimensionally approaches a full-slot cutting blade, but provides some clearance on one side of the cutting blade, uneven blade wear is reduced, the cutting blade remains capable of being trued, and a front rake angle and/or hook angle can be included.

Figure 5:
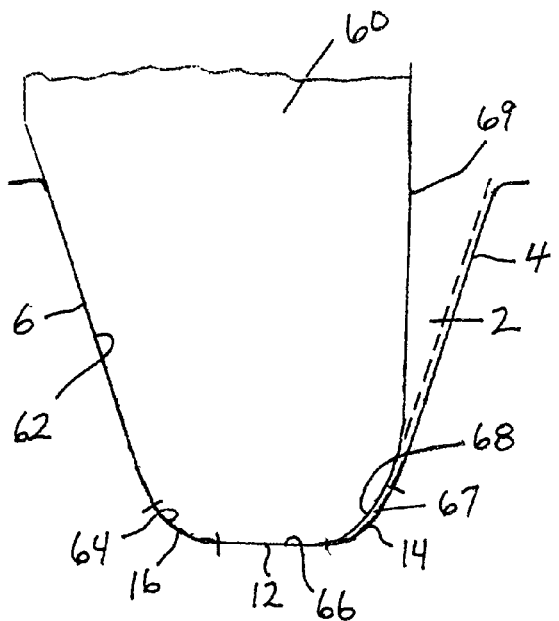
FIG. 5 shows an inventive cutting blade positioned to remove a portion of stock material from a tooth slot.
Figure 6:
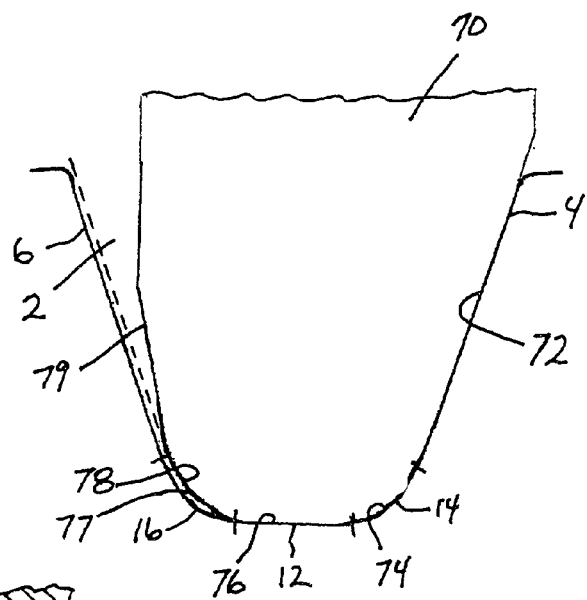
FIG. 6 shows an inventive cutting blade positioned to remove another portion of stock material from a tooth slot.
Figure 7:
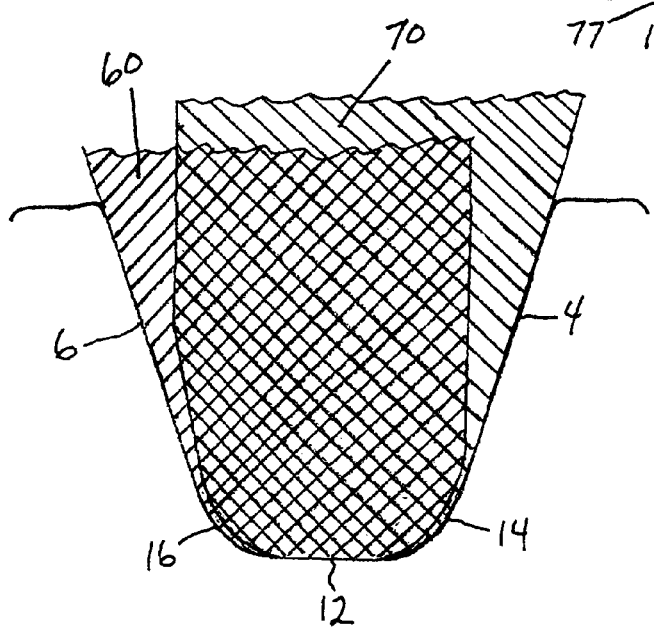
FIG. 7 shows the cutting positions of the cutting blades of FIG. 5 and FIG. 6 for cutting a gear during face milling.

The inventive cutting blade is shown in FIGS. 5-7. In FIG. 5, an inside cutting blade 60 is illustrated comprising a pressure angle cutting edge 62, a pressure radius cutting edge portion 64 and tip cutting edge portion 66 (collectively, the "primary" cutting edge portion) which together cut, respectively, side 6, radius 16 and the entire bottom portion 12 of slot 2 to a predetermined form or geometry, for example, a desired rough form (stock allowance left for subsequent grinding) or a desired finished form, either of which may be understood as being exemplified by the form of tooth slot 2 in FIG. 2. It is to be understood that the present invention is not limited to the slot 2 form but is applicable to any tooth slot form or geometry produced by generated or non-generated face milling.

The inventive cutting blade also includes another radius cutting portion 68 (i.e. the clearance radius cutting edge) that is of a dimension less than that required to form the predetermined radius 14. Therefore, clearance radius cutting edge 68 "roughs out" the other tooth slot radius 14 to a form near to the predetermined form but leaves a distance 67 between the predetermined tooth slot radius position 14 and the clearance radius cutting edge 68 that comprises excess stock material. Cutting blade 60 also includes clearance side 69 which may also be a cutting edge, along all or part of its length, to rough cut the other flank surface 4 of tooth slot 2. The clearance radius cutting edge 68 and any cutting edge on clearance side 69 define a "secondary" cutting edge portion.

Of course, the discussion above likewise applies to outside cutting blade 70 as shown in FIG. 6 wherein the cutting blade comprises pressure angle cutting edge 72, radius cutting edge 74 and tip cutting edge 76 (collectively, the "primary" cutting edge portion) which together cut, respectively, side 4, radius 14 and the entire bottom portion 12 of slot 2 to a predetermined form or dimension, for example, a desired rough form (stock allowance left for subsequent grinding) or a desired finished form either of which also may be understood as being exemplified by the form of tooth slot 2 in FIG. 2.

The inventive cutting blade 70 also includes another radius cutting edge portion 78 (i.e. the clearance radius cutting edge) that is of a dimension less than that required to form the predetermined radius 16. Therefore, clearance radius cutting edge 78 "roughs out" the other tooth slot radius 16 to a form near to the predetermined form but leaves a distance 77 between the predetermined tooth slot radius position 16 and the clearance radius cutting edge 78 that comprises excess stock material. Cutting blade 60 also includes clearance side 69 which may also be a cutting edge, along all or part of its length, to rough cut the other flank surface of tooth slot 2. The clearance radius cutting edge 78 and any cutting edge on clearance side 79 define a "secondary" cutting edge portion.

The amount of stock material remaining (i.e. the distance) after cutting at the roughed-out tooth slot radius (e.g. 67 in FIG. 5 or 77 in FIG. 6) may be any amount based on parameters such as the gear and/or cutting blade design including adequate blade strength and/or cutting edge support, wear tendencies of the cutting blade, whether the gear will undergo a finishing operation, the amount of slot tolerance desired for truing, etc. However, a preferred amount of stock material remaining in the roughed-out tooth slot radius after cutting is about 0.002-0.0002 inch (0.051-0.0051 mm).

The clearance edges 69 and 79 are shown with different configurations but the present invention is not limited thereto. The clearance edge may be straight as shown in FIG. 5, curved, or may more closely follow the contour of the tooth profile surface, as shown in FIG. 6, along all or only a portion of the flank profile. If desired, the clearance cutting edge may be spaced from the tooth flank profile at a distance the same or about the same as that of distance 67 or 77, as shown in phantom in FIGS. 5 and 6 respectively, or it may vary in distance from the tooth flank profile surface. The clearance radius cutting edge (68, 78) as well as any clearance side cutting edge (e.g. 69, 79) do not produce the final desired gear geometry.

With the inventive configuration, the pressure angle cutting edge and pressure radius cutting edge cut a tooth slot in the same manner as is known in the art. However, the expanded tip edge as well as the clearance radius cutting edge, and optionally, the clearance cutting edge itself, provide for a balanced load on the cutting blades. For example, looking at prior art FIG. 3, as either inside or outside cutting blade passes through the tooth slot, nearly all cutting occurs at the pressure angle edge, radius edge portion and tip portion of a cutting blade. However, the region between a respective clearance edge and the opposite side of the tooth slot is not contacted by the cutting blade. The next cutting blade through the tooth slot encounters the same conditions but only on the other side of the slot. In either instance, cutting loads in the vicinity of the pressure side radius edge are high and blade-wear in this region is more prevalent. With the present invention, each cutting blade coming through the tooth slot removes about the same amount of stock material along a greater portion of the cutting blade. Hence, cutting loads are more even and reduced overall.

Also as stated above, with the secondary cutting edge portion not cutting to the final desired geometry of a tooth slot, sufficient blade clearance is provided (e.g. distance 67 or 77) such that the inventive cutting blade can be trued. The pressure angle cutting edge can be adjusted to a proper position without adversely affecting the function or purpose of the clearance cutting edge or clearance radius cutting edge (which is not possible with full-slot cutting blades) due to the diminished dimension of the cutting blade at the clearance radius cutting edges 68, 78. The distance 67, 77 between the location of the actual cut and the predetermined or desired location of the tooth slot allow for movement of the cutting blade thus providing the opportunity for truing.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A gear cutting blade for forming a slot between adjacent teeth on a gear in a face milling process, said slot having a predetermined form, said cutting blade comprising:
   a cutting end having a pressure angle cutting edge, a pressure radius cutting edge, a tip cutting edge, a clearance radius cutting edge and a clearance side,
   a primary cutting edge defined by said pressure angle cutting edge, pressure radius cutting edge and tip cutting edge, said primary cutting edge being dimensioned to cut corresponding respective side, radius and bottom portions of said slot to the predetermined form,
   a secondary cutting edge consisting of said clearance radius cutting edge, said secondary cutting edge being dimensioned less than that required to cut a corresponding radius portion of the slot to the predetermined form wherein during cutting with said secondary cutting edge, a distance exists between said clearance radius cutting edge and the position of said corresponding radius portion of the slot of the predetermined form.

2. The cutting blade of claim 1 being an inside cutting blade.

3. The cutting blade of claim 1 being an outside cutting blade.

4. The cutting blade of claim 1 wherein said distance is in the range of 0.002-0.0002 inch.

* * * * *